(12) United States Patent
Catarino et al.

(10) Patent No.: US 11,390,182 B2
(45) Date of Patent: Jul. 19, 2022

(54) INTEGRATED DATA AND CHARGING STATION

(71) Applicant: ZAYO GROUP, LLC, Boulder, CO (US)

(72) Inventors: Jose Catarino, Aurora, CO (US); Aaron Werley, Erie, CO (US); John Knauss, Indianapolis, IN (US); Benjamin Campbell, Fort Collins, CO (US); Christopher Parra, Boulder, CO (US)

(73) Assignee: ZAYO GROUP, LLC, Boulder, CO (US)

( * ) Notice: Subject to any disclaimer, the term of this patent is extended or adjusted under 35 U.S.C. 154(b) by 0 days.

(21) Appl. No.: 16/990,766

(22) Filed: Aug. 11, 2020

(65) Prior Publication Data

US 2022/0141143 A1    May 5, 2022

Related U.S. Application Data

(60) Provisional application No. 62/899,266, filed on Sep. 12, 2019.

(51) Int. Cl.
*B60L 53/66* (2019.01)
*B60L 53/10* (2019.01)
(Continued)

(52) U.S. Cl.
CPC ............. *B60L 53/66* (2019.02); *B60L 53/10* (2019.02); *B60L 53/30* (2019.02); *B64C 39/024* (2013.01);
(Continued)

(58) Field of Classification Search
CPC .......... B60L 53/10; B60L 53/14; B60L 53/16; B60L 53/18; B60L 53/30; B60L 53/51;
(Continued)

(56) References Cited

U.S. PATENT DOCUMENTS

| 5,594,318 A | 1/1997 | Nor et al. |
| 6,157,162 A | 12/2000 | Hayashi et al. |

(Continued)

FOREIGN PATENT DOCUMENTS

| CN | 201887496 U | 6/2011 |
| CN | 103631239 A | 3/2014 |

(Continued)

OTHER PUBLICATIONS

Bosch "Electric Vehicle Solutions" Available at https://www.boschevsolutions.com/; printed Sep. 8, 2020.

(Continued)

*Primary Examiner* — Richard Isla
*Assistant Examiner* — Johali A Torres Ruiz
(74) *Attorney, Agent, or Firm* — Jason H. Vick; Sheridan Ross, PC

(57) ABSTRACT

The present disclosure is generally directed to an integrated charging and data transfer station for an electric vehicle. The integrated station includes a charger to transfer electricity to the electric vehicle. A data transfer system of the integrated station includes a fiber optic system to connect the electric vehicle to a network. Optionally, the integrated station can include a roof with a landing station for an unmanned aerial vehicle.

24 Claims, 7 Drawing Sheets

(51) Int. Cl.
*B60L 53/30* (2019.01)
*H02J 1/00* (2006.01)
*B64C 39/02* (2006.01)
*B64F 1/36* (2017.01)

(52) U.S. Cl.
CPC .............. *B64F 1/362* (2013.01); *H02J 1/001* (2020.01); *B64C 2201/042* (2013.01)

(58) Field of Classification Search
CPC ...... B60L 53/66; B60L 53/305; B60L 53/306; H02J 1/001; B64F 1/362; B64C 39/024; B64C 2201/042
See application file for complete search history.

(56) References Cited

U.S. PATENT DOCUMENTS

| | | | |
|---|---|---|---|
| 6,853,795 B2 | 2/2005 | Dagley et al. | |
| 7,218,827 B2 | 5/2007 | Vongsen et al. | |
| 8,929,069 B2 | 1/2015 | Muller et al. | |
| 9,054,539 B2 | 6/2015 | Muller et al. | |
| 2003/0067897 A1* | 4/2003 | Black | H04B 7/264 370/335 |
| 2010/0081473 A1 | 4/2010 | Chatterjee et al. | |
| 2010/0277121 A1 | 11/2010 | Hall et al. | |
| 2011/0077809 A1 | 3/2011 | Leary | |
| 2012/0112694 A1 | 5/2012 | Frisch et al. | |
| 2012/0306443 A1* | 12/2012 | Smith | H02J 7/0042 320/109 |
| 2013/0080254 A1* | 3/2013 | Thramann | G06Q 50/06 705/14.57 |
| 2013/0241483 A1* | 9/2013 | Karch | B60L 53/68 320/109 |
| 2013/0254097 A1* | 9/2013 | Marathe | G07F 15/005 705/39 |
| 2014/0048638 A1 | 2/2014 | Falk et al. | |
| 2014/0176070 A1 | 6/2014 | Krammer | |
| 2016/0336772 A1 | 11/2016 | Dallachiesa et al. | |
| 2017/0174090 A1* | 6/2017 | Lakamp | B60L 53/305 |
| 2017/0203662 A1 | 7/2017 | Hiebenthal et al. | |
| 2017/0344000 A1* | 11/2017 | Krishnamoorthy | G08G 5/0013 |
| 2018/0115130 A1 | 4/2018 | Truluck et al. | |
| 2018/0246289 A1 | 8/2018 | Amaya Cruz | |
| 2018/0255557 A1* | 9/2018 | Andreoli-Fang | H04W 72/1294 |
| 2018/0281607 A1 | 10/2018 | Galin et al. | |
| 2019/0164127 A1* | 5/2019 | Kataoka | G05D 1/0225 |
| 2020/0128470 A1* | 4/2020 | Mok | H04W 72/02 |
| 2021/0122259 A1* | 4/2021 | Dobie | B60L 53/31 |

FOREIGN PATENT DOCUMENTS

| | | |
|---|---|---|
| DE | 102011082092 A1 | 3/2013 |
| DE | 102012202688 A1 | 8/2013 |
| EP | 2871090 A1 | 5/2015 |
| EP | 3351422 A1 | 7/2018 |
| JP | 2012-135111 A | 7/2012 |
| JP | 2012-172500 A | 9/2012 |
| KR | 10-2017-0138663 A | 12/2017 |
| WO | WO 2011/156776 A2 | 12/2011 |
| WO | WO 2016/113766 A1 | 7/2016 |

OTHER PUBLICATIONS

Clearfield "FieldSmart Fiber Delivery Point (FDP) Indoor Metal Fiber Wall Box—36, 96, and 144 Port" Available at https://www.seeclearfield.com/products/category/wall-box-metal/indoor-wall-panels.html; retrieved Sep. 8, 2020.

International Telecommunication Union "ITU-T G.657 Fibres: Bend-Insensitive Single-Mode Fibres for Access Networks and Customer Premises" Available at https://www.itu.int/dms_pub/itu-t/oth/0b/04/T0B040000542C01PDFE.pdf; Oct. 2013 (2 pages).

International Telecommunication Union "ITU-T G.657: Series G: Transmission Systems and Media, Digital Systems and Networks: Transmission Media and Optical Systems Characteristics—Optical Fibre Cables" Nov. 2016 (24 pages).

Neutrik AG, "OpticalCON: Fiber Optic Connection System" Available at https://www.canford.co.uk/ProductResources/resources/N/Neutrik/OpticalCON/Opticalcon%20Brochure%202017_03%20V19.pdf; Mar. 2017 (56 pages).

Neutrik AG "Technical Paper: OpticalCon: Fiber Optic Connection System" Version 3; Available at vhttps://www.canford.co.uk/ProductResources/resources/N/Neutrik/opticalCON%20Technical%20Paper%20V3.pdf; Retrieved Sep. 8, 2020 (29 pages).

Skycharge "Introducing Skycharge Outdoor Charging Pad" Available at https://www.skysense.co/charging-pad-outdoor; 2014-2020 (4 pages).

Invitation to Pay Additional Fees and, Where Applicable, Protest Fee for International Application No. PCT/US2020/045768, dated Oct. 7, 2020.

International Search Report for International Application No. PCT/US2020/045768, dated Dec. 21, 2020.

Written Opinion for International Application No. PCT/US2020/045768, dated Dec. 21, 2020.

European Search Report for European Application No. 20765184.5, dated Sep. 3, 2021.

Office Action for European Application No. 20765184.5, dated Sep. 15, 2021.

Examiner's Report for Canadian Patent Application No. 3,093,597, dated Dec. 2, 2021.

International Preliminary Report on Patentability for International Application No. PCT/US2020/045768, dated Mar. 24, 2022.

Office Action for European Application No. 20765184.5, dated Mar. 18, 2022.

* cited by examiner

INTEGRATED DATA AND CHARGING STATION

CROSS REFERENCE TO RELATED APPLICATIONS

This application claims the benefit of and, under 35 U.S.C. § 119(e), priority to U.S. Provisional Patent Application No. 62/899,266, filed Sep. 12, 2019, entitled "INTEGRATED DATA AND CHARGING STATION," which is incorporated herein by reference in its entirety.

SUMMARY

One aspect of the present disclosure is generally directed to a charging and data transfer station for electric vehicles. More specifically, the present disclosure is related to a charging station for electric vehicles with an integrated data transfer system. The data transfer system can include a fiber optic system to connect an electric vehicle to a network. In one embodiment, the charging station can charge and transfer data to an unmanned aerial vehicle (UAV) or drone.

Determining an optimum route for a vehicle to pickup and delivery sites in a service area is a particularly challenging computational problem. In some cases, deliveries must be made within a specific time window. The vehicle's route frequently changes throughout the day to respond to changing conditions and customer requirements, further complicating the problem. For example, pickup sites can be added when customers schedule items for return that must be picked up by the vehicle. Suppliers also fill orders that need to be delivered to customers which may require re-routing of the vehicle. Delivery sites and schedules may also change due to customer needs. Changes to routes also occur when the vehicle must be re-routed due to changes in the status of a second vehicle in a vehicle fleet (such as a malfunction of the second vehicle, or when the second vehicle is re-routed to service a preferred or higher status customer). Additionally, the schedule and route of the vehicle may also change to respond to changes such as congestion and road closures.

Changes in the weather can also result in changes in the route of the vehicle. The weather may slow the vehicle and cause the vehicle to be re-routed. The vehicle may be re-routed to avoid severe weather. Additionally, some items scheduled for delivery may have a maximum (or minimum) temperature requirement that must be met. The vehicle may need to be rerouted to deliver a temperature sensitive item earlier than planned to avoid exceeding a temperature floor or ceiling when ambient temperatures move outside a predetermined range.

The range and operating time of the vehicle further complicate the routing of the vehicle. Electric vehicles typically have a shorter range compared to vehicles that use fossil fuels. For example, some electric delivery vehicles have a range of less than 100 miles or up to approximately 150 miles. If the electric vehicle has a cargo area that is heated (or cooled) to protect cargo, the range of the vehicle may decrease substantially on a cold (or hot) day. Accordingly, the route of an electric delivery vehicle must account for periodic stops at charging stations.

The complexity of the routing problem and frequent re-routing makes the transmission of routing instructions to the vehicle challenging. The vehicle may operate in locations with limited or degraded coverage by wireless networks making delivery of routing updates by cellular or other wireless networks difficult. Additionally, routing instructions (which can include schedules with directions, graphics files, and weather information and maps) for each vehicle typically are quite large and may be impracticable to transmit over wireless networks and/or over public shared capacity wireless networks.

Additionally, vehicle updates (firmware, software, map data, route data, payload data, maintenance data, vehicle sensor data, vehicle error data, etc.) tend to be large files which are more efficiently accommodated with the bandwidth fiber provides.

Accordingly, there is an unmet need for a charging station for electric vehicles with an integrated data transfer capability.

It is one aspect to provide a data transfer and charging station for an electric vehicle.

In embodiments, both electric power and a fiber optic network connection are provided from a pedestal to a vehicle.

In embodiments, fiber-based network connectivity is provided via a fiber cable connected to the vehicle while the vehicle may also be receiving a charge.

It is another aspect of the present disclosure to provide a method of connecting an electric vehicle to a network, and optionally the cloud and/or remote server(s), and transferring electricity to the electric vehicle for charging.

In embodiments, network connectivity is provided via one or more of a wired, optical and/or wireless connection to the vehicle while the vehicle may also be receiving a charge.

In embodiments, the system is also capable of providing drive cloning and local storage in one or more data storage devices (not shown). The system can also optionally be equipped with protected routing to ensure near 100% availability.

Optionally, connectivity to the vehicle can be provided by one or more of fiber optic, wireless/WiFi, ethernet, or in general any wired or wireless connection. Additional optional features includer the ability to perform physical drive cloning and transfer.

Yet another aspect of the present disclosure is an integrated data transfer and charging station for an electric vehicle that has a small physical footprint. The integrated station generally includes a frame with a roof, a pedestal, a charger connected to an electrical grid or other power supply (such as solar, a generator, or the like) to transfer electricity to the electric vehicle, and a fiber optic data system to connect the vehicle to a network. By limiting the physical footprint of the integrated station and combining charging and data transfer capabilities at one location, the integrated station can be placed in a variety of locations within a service area of the electric vehicle. In this manner, the integrated station can increase the range of the electric vehicle and decrease the amount of time required to transmit updated routing instructions to the electric vehicle.

One aspect of the present disclosure is to provide data transfer and charging station for a vehicle. The data transfer and charging station generally includes, but is not limited to: (1) a frame with a roof; (2) a pedestal positioned under the roof; (3) a charger for transferring electricity from an electrical supply to a vehicle; and (4) a data transfer system to connect the vehicle to a network, the charger and the data transfer system being associated with the pedestal.

In embodiments, the data transfer system includes a fiber optic cable with an optical connector to connect to a data port of the vehicle.

In embodiments, the fiber optic cable is retained by a reel positioned within a compartment of the pedestal.

In embodiments, the optical connector is associated with a plug of the charger.

In embodiments, the data transfer system further comprises one or more of: (a) an uninterruptible power supply; (b) a network interface device to connect the data transfer system to the network; and (c) a fiber distribution panel to connect the network interface device to the optical connector.

In embodiments, the charger includes a cable extending from the pedestal, the cable including a plug to connect to a receptacle of the vehicle.

In embodiments, the cable includes a fiber optic cable associated with the data transfer system and the plug includes an optical connector to connect the vehicle to the network.

In embodiments, the plug is positioned on an arm to automatically connect the plug to the vehicle receptacle.

In embodiments, the roof includes a landing pad for an unmanned aerial vehicle.

In embodiments, the landing pad can transfer electricity from the electrical supply to the unmanned aerial vehicle.

In embodiments, the landing pad can connect the unmanned aerial vehicle to the network and transfer data to and from the unmanned aerial vehicle.

In embodiments, the roof includes a solar panel to convert sunlight into DC power, the solar panel connected to the charger and the electrical supply.

Another aspect of the present disclosure is method of connecting a vehicle to a network and transferring electricity to the vehicle, comprising: (1) positioning the vehicle proximate to a pedestal of a data transfer and charging station; (2) connecting a plug of a charger to a receptacle of the vehicle, the charger connected to a source of electricity; and (3) connecting an optical connector of a data transfer system to a data port of the vehicle, the data transfer system connected to the network, the charger and the data transfer system being associated with the pedestal.

In embodiments, the optical connector is associated with a fiber optic cable retained by a reel positioned in the pedestal.

In embodiments, the plug of the charger includes the optical connector.

In embodiments, connecting the plug of the charger to the receptacle of the vehicle further includes: (1) determining a position of the receptacle of the vehicle; (2) moving an arm of the data transfer and charging station proximate to the vehicle, wherein the arm includes the plug of the charger; and (3) automatically connecting the plug to the receptacle.

In embodiments, the method further includes transferring a delivery route to the vehicle.

Another aspect is to provide an integrated data transfer and charging station for a vehicle, comprising: (1) a pedestal positioned within a structure; (2) a charger for transferring electricity from an electrical supply to a vehicle; and (3) an optical data transfer system to connect the vehicle to a network, wherein the charger and the data transfer system are associated with the pedestal.

In embodiments, electricity for the electrical supply and optical fiber are provided within the same cable or in different cables.

In embodiments, the integrated data transfer and charging station further comprises one or more of a media converter, a network switch, a router, a modem, an access point, a transceiver, a Wi-Fi router and a wireless router.

BRIEF DESCRIPTION OF THE DRAWINGS

The accompanying drawings, which are incorporated in and constitute a part of the specification, illustrate embodiments of the disclosed system and together with the general description of the disclosure given above and the detailed description of the drawings given below, serve to explain the principles of the disclosed system(s) and device(s).

Figure 1:
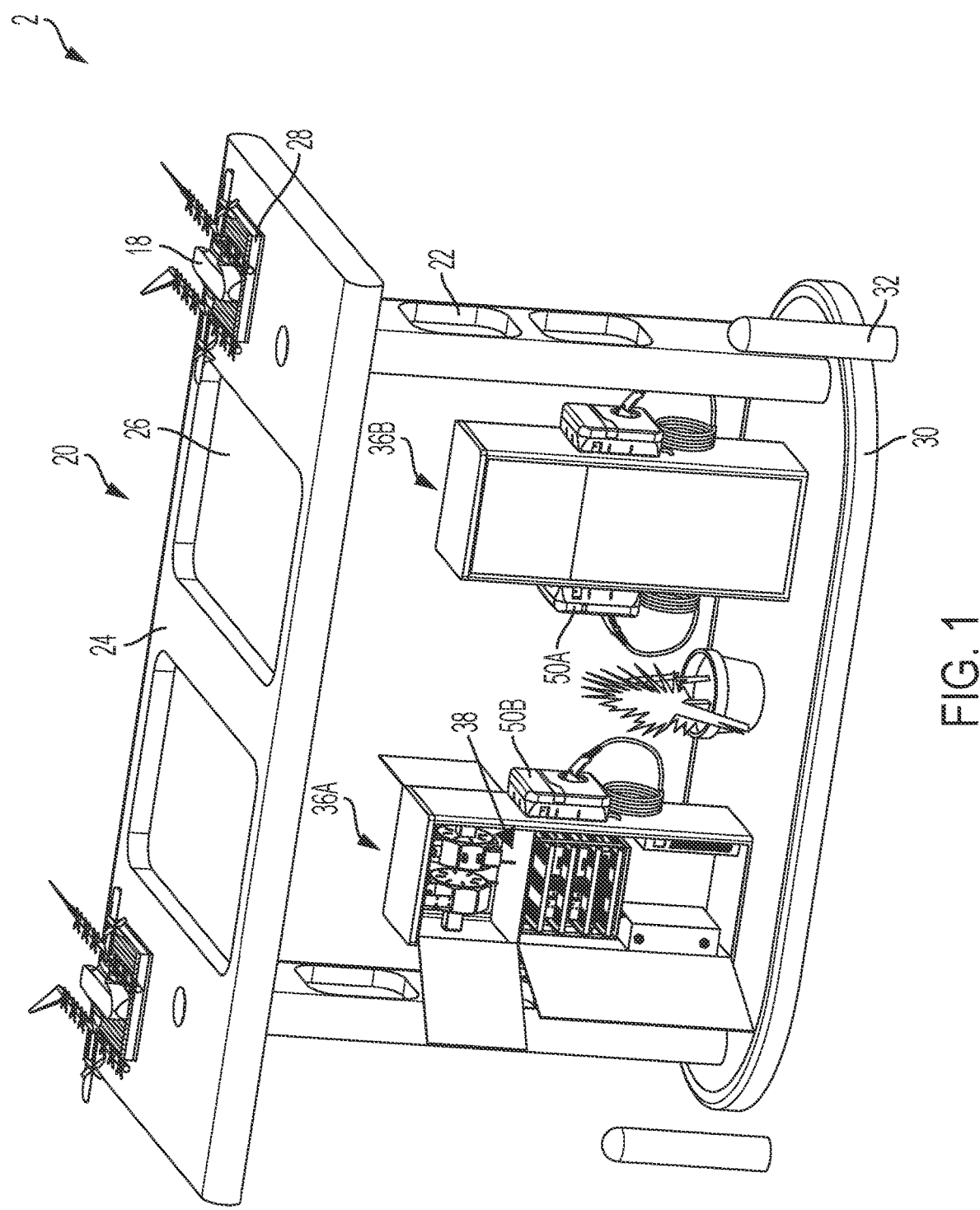
FIG. 1 is a perspective view of an integrated charging and data transfer station according to one embodiment of the present disclosure.
Figure 2:
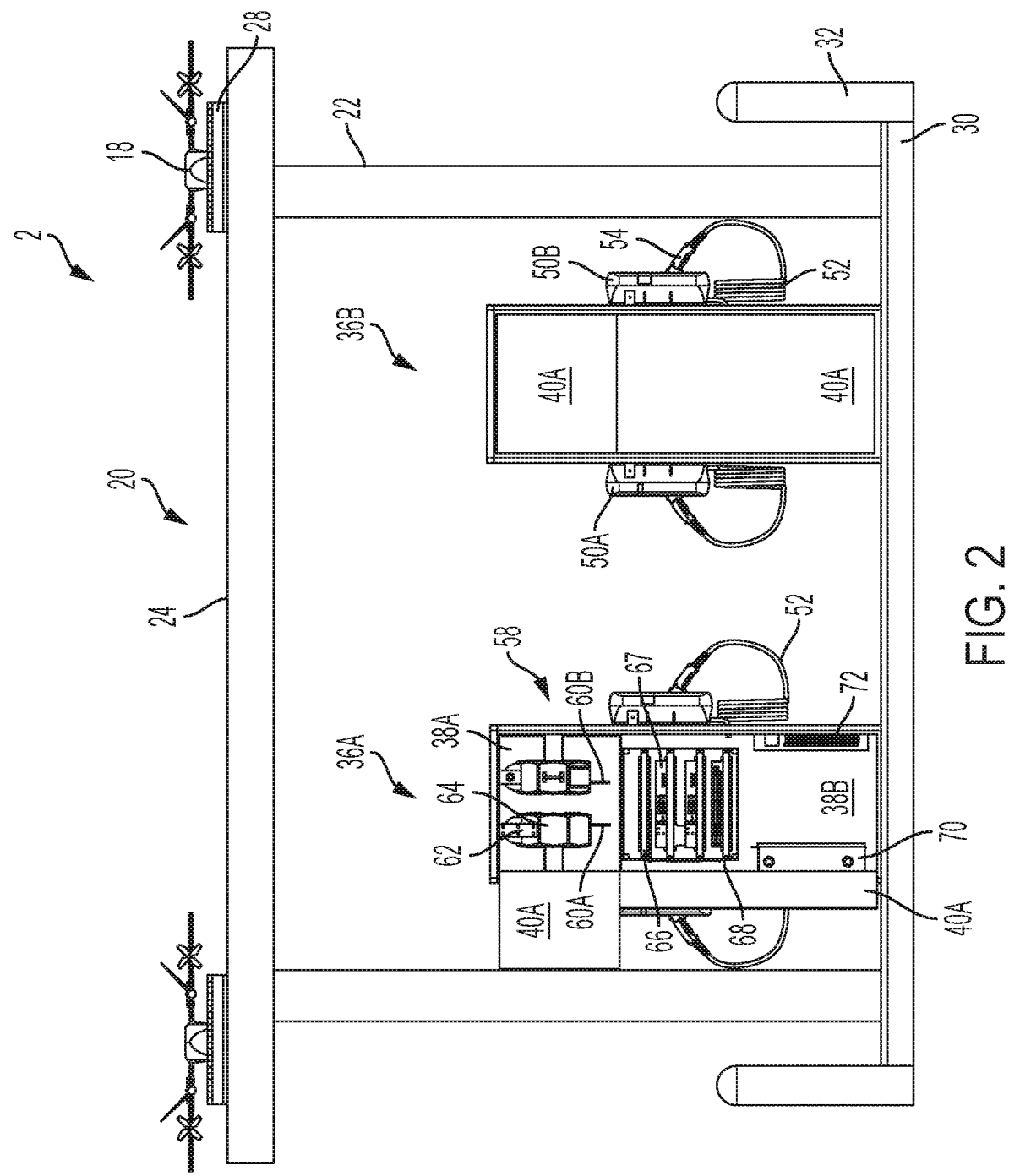
FIG. 2 is a front elevation view of the integrated charging and data transfer station of FIG. 1.
Figure 3B:
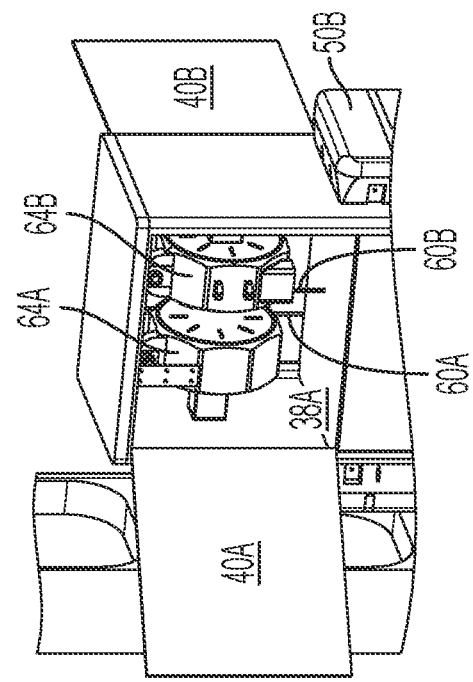
FIG. 3B is a perspective view of a first compartment of the pedestal of FIG. 3A.
Figure 3A:
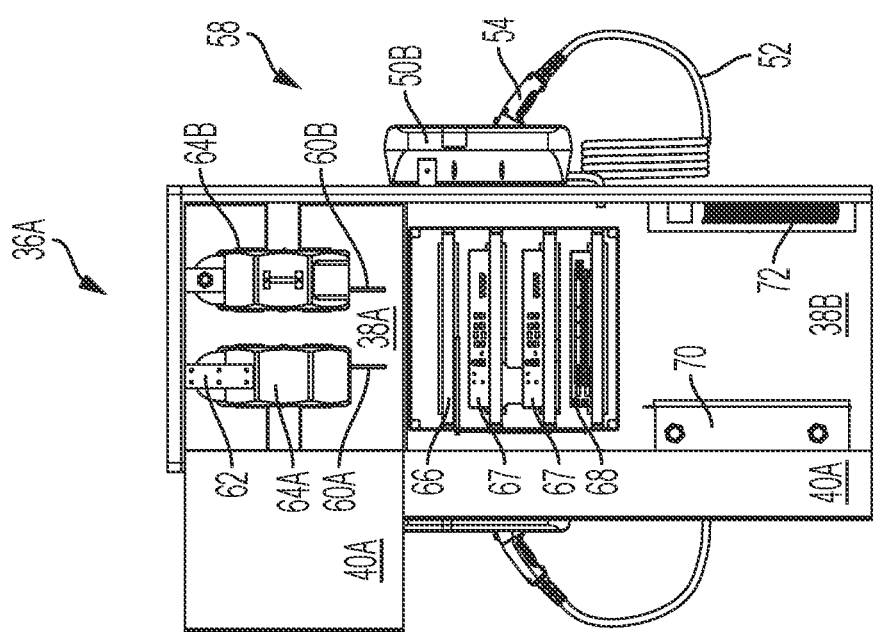
FIG. 3A is a front elevation view of a pedestal of the integrated charging and data transfer station according to one embodiment.
Figure 3D:
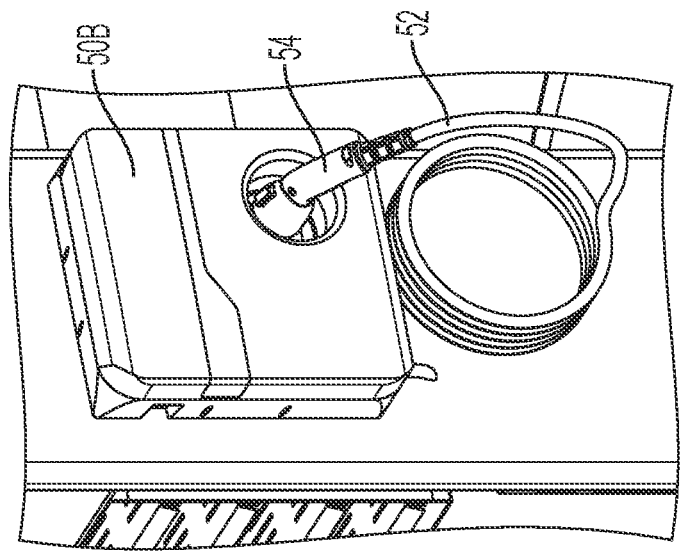
FIG. 3D is a perspective view of a charger associated with the pedestal of FIG. 3A.
Figure 3C:
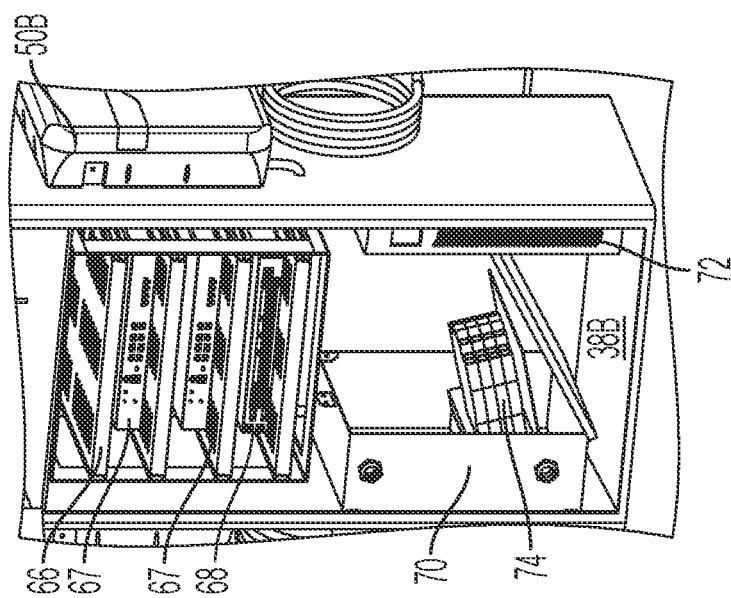
FIG. 3C is a perspective view of a second compartment of the pedestal of FIG. 3A.
Figure 4:
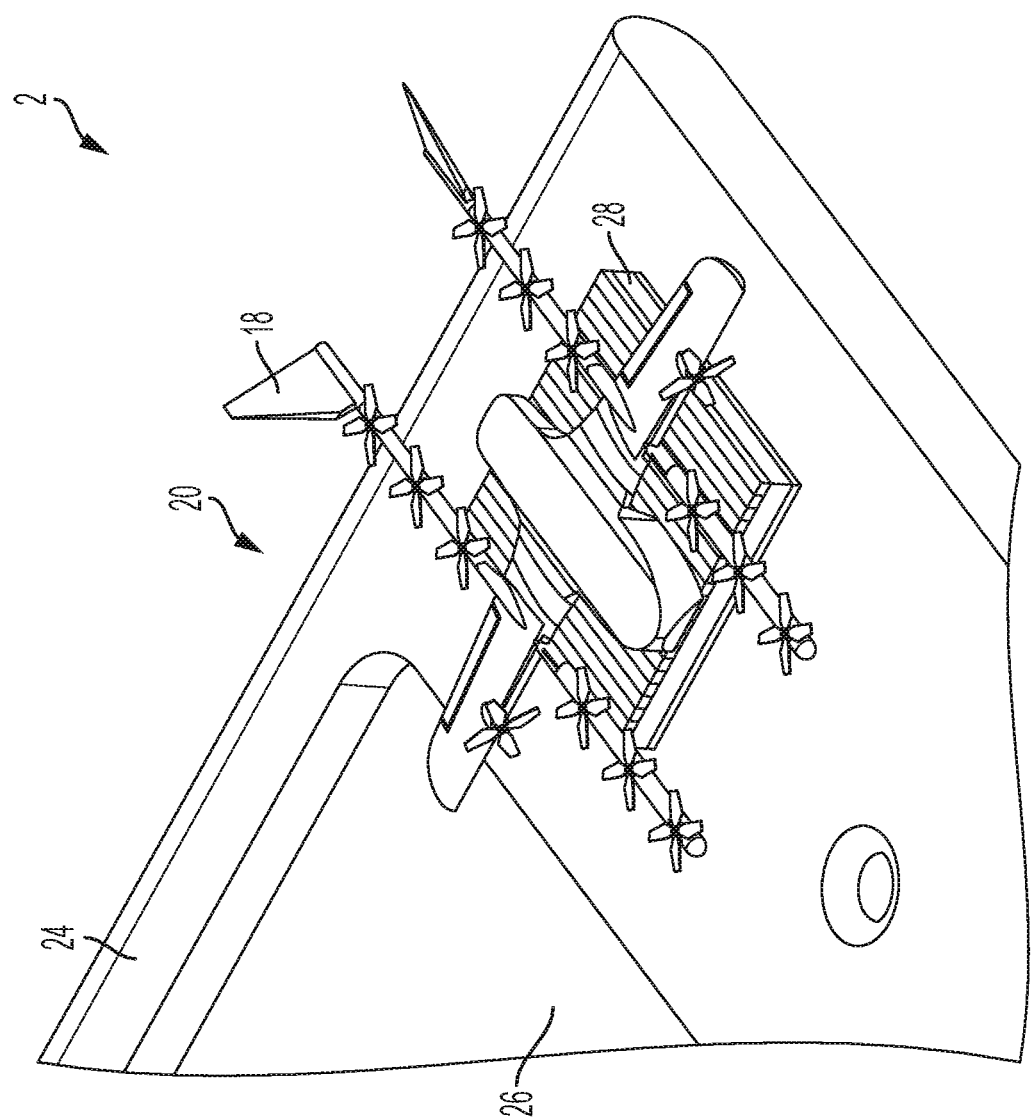
FIG. 4 is a perspective view of a portion of the roof of the integrated charging and data transfer station of FIG. 1.
Figure 5:
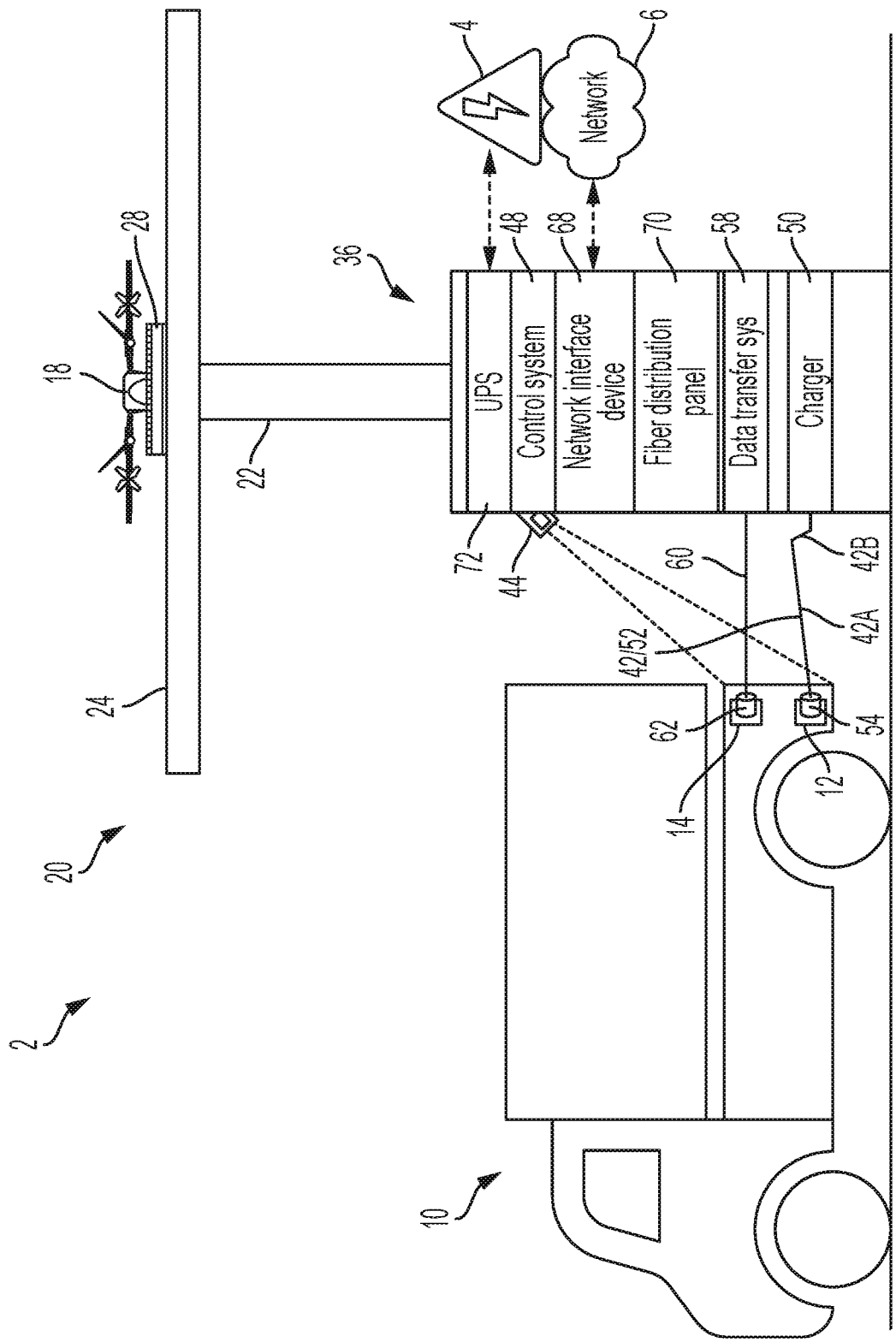
FIG. 5 is a schematic view of an integrated charging and data transfer station according to one embodiment of the present disclosure.

The drawings are not necessarily to scale. In certain instances, details that are not necessary for an understanding of the disclosure or that render other details difficult to perceive may have been omitted. It should be understood, of course, that the disclosure is not necessarily limited to the embodiments illustrated herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

The following is a listing of components according to various embodiments of the present disclosure, and as shown in the drawings:

| Number | Description |
| --- | --- |
| 2 | Integrated data and charging station (or "integrated station") |
| 4 | Electrical grid or power supply |
| 6 | Network/Cloud |
| 10 | Electric vehicle |
| 12 | Receptacle for electric plug |
| 14 | Data port |
| 18 | Unmanned aerial vehicle |
| 20 | Shelter |
| 22 | Frame |
| 24 | Roof |
| 26 | Solar panel |
| 28 | Landing pad |
| 30 | Plinth |
| 32 | Barrier or bollard |
| 36 | Pedestal |
| 38 | Compartment |
| 40 | Door |
| 42 | Arm |
| 44 | Sensor |
| 48 | Control system |
| 50 | Charger |
| 52 | Cable |
| 54 | Plug |
| 58 | Data transfer system |

-continued

| Number | Description |
|---|---|
| 60 | Fiber optic cable |
| 62 | Optical connector |
| 64 | Reel |
| 66 | Cable access enclosure |
| 67 | Edge device |
| 68 | Network interface device (NID) |
| 70 | Fiber distribution panel |
| 72 | Uninterruptible power supply |
| 74 | Cassette |
| 80 | Bus |
| 82 | Processing units or CPUs |
| 84 | Input device |
| 86 | Output device |
| 88 | Storage device |
| 90 | Computer-readable storage media reader |
| 92 | Communications system |
| 94 | Working memory |
| 96 | Processing acceleration unit |
| 98 | Database |
| 100 | Remote database |
| 102 | Operating system |
| 104 | Other code or programs |

DETAILED DESCRIPTION

It is with respect to the above issues and other problems that the embodiments presented herein were contemplated. Embodiments of the present disclosure will be described in connection with an integrated charging and data transfer station 2 for electric vehicles and associated systems.

Referring now to FIGS. 1-5, an integrated data and charging station (or "integrated station") 2 is generally illustrated. The integrated station 2 generally includes, but is not limited to, a pedestal 36 positioned under a shelter 20. Optionally, the charging station can include two or more pedestals 36A, 36B, and there can be multiple integrated stations at one facility.

The shelter 20 can include a frame 22 and a roof 24. The shelter 20 may be of any size and shape. In one embodiment, the roof is generally rectangular. The shelter may have a height of between about 90 inches and about 130 inches.

The pedestal 36 generally includes a charger 50 and a data transfer system 58. In one embodiment, the pedestal includes two chargers 50A, 50B. Additionally, or alternatively, the pedestal can include two fiber optic cables 60A, 60B connected to the data transfer system 58. The pedestal 36 can optionally be positioned on a plinth 30. Optionally, one or more bollards 32 are positioned to protect the pedestal 36 from impact.

The pedestal 36 may be of any desired size or shape. In one embodiment, the pedestal 36 has a generally rectangular shape. The pedestal may optionally have a height of between approximately 45 inches and approximately 75 inches, or approximately 60 inches. The pedestal may be made of a metal material, such as ¼ inch thick steel.

A bay or compartment 38 may be formed within the pedestal. The pedestal 36 can optionally include two or more compartments 38A, 38B. The compartment 38 may include at least one door 40. In one embodiment, each compartment 38 includes two doors with one door 40A on a front and another door 40B on an opposite back of the pedestal 36. Components associated with the charger 50 and data transfer system 58 can be positioned within one or more compartments 38 of the pedestal 36. The compartment 38 can include a seal to prevent entry of debris and moisture. In one embodiment, the pedestal 36 and the compartment 38 are sealed to provide protection from wind, rain, snow, sleet, and ice.

The charger 50 is connected to an electrical grid or supply 4 and is configured to transfer electricity from the grid to an electric vehicle 10, such as an electric delivery truck or van, an autonomous car, or the like. A cable 52 of the charger includes a plug 54 to engage a receptacle 12 of the electric vehicle 10. In one embodiment, the cable 52 is accessible from a side of the pedestal. Optionally, when the pedestal includes two chargers, a first charger 50A is accessible from a first side of the pedestal and a second charger 50B can be accessible from a second side of the pedestal 36. The cable 52 is of a predetermined length. In one embodiment, the cable 52 has a length of from approximately 3 feet to approximately 30 feet. Optionally, the cable can be on a spool, such as a self-retracting spool.

Suitable chargers 50 are known to those of skill in the art. For example, Bosch® and other manufacturers produce chargers 50 that are suitable for use with the integrated station 2 of embodiments of the present disclosure. In one embodiment, the charger 50 is a Bosch Level 2 Charging Station. Optionally, the charger 50 may include elements of one or more of Bosch's EV200, EV400, EV600, EV800, and EV2000 series chargers. More information about Bosch chargers is available at https://www.boschevsolutions.com/ which is incorporated herein by reference in its entirety.

The integrated station 2 can optionally include an uninterruptable power supply (UPS) 72 that is also connected to the electrical grid or suitable power supply 4. The UPS 72 can be configured to provide electricity to the charger 50 and other components of the integrated station 2 and for transfer to the electric vehicle 10 if electricity is not available from the electrical grid 4.

The data transfer system 58 is interconnected to a network 6. In one embodiment, the data transfer system 58 includes a network interface device (NID) 68 and/or an edge device 67 in communication with the network 6. Examples of edge devices include devices/servers/systems that are capable of providing an entry point into one or more enterprise networks and/or service provider core networks. Edge devices can include one or more of routers, routing switches, integrated access devices, multiplexers, and metropolitan area network and wide area network access devices. The data transfer system can also optionally include a media converter, one or more network switches, short/long range media converter(s), one or more wired or wireless transceivers, a router, an access point, and in general any known wired on wireless connectivity components that allow the integrated station 2 to transfer data to/from one or more vehicles. The NID 68 and one or more of the other network components may be positioned within a compartment 38B of the pedestal 36. The data transfer system 58 can be configured to transfer data at any speed, such as 10 Gbps. In one embodiment, the data transfer system 58 can transfer data between an electric vehicle 10 and the network 6 at a rate of at least 1 Gbps. Optionally, the data transfer rate is up to approximately 25 Gbps. In one embodiment, the data transfer system 58 can transfer data at a rate of between approximately 1 Gbps and 25 Gbps, or approximately 10 Gbps.

Optionally or additionally, an integrated data transfer and charging station for a vehicle is provided. The station can also comprise an intelligent data routing system such that data moving from or to a vehicle can automatically route based on the preferred end-point(s) associated with the individual vehicle and potentially differ from another vehicle. This preference-based routing could be enabled utilizing an electronic signal, header information, identifier information, license plate information, Vehicle Identification Number (VIN) information, a physical identifier associated with the vehicle and/or user and/or in general any information associated with the vehicle, user, manufacturer, owner, manager, and/or charging station.

As one example, for a specific vehicle, priority routing to a cloud-based endpoint could be provided such that data transfer to/from this specific vehicle is prioritized over other vehicles. One example of where this could be useful is for large fleet-based delivery vehicles that are on tight schedules.

As another example, and for a free tier service, data transfer to/from the vehicle can be on an as available bandwidth basis with priority given to data to other vehicles with a higher priority. However, other configurations are possible as this is just one non-limiting example. In general, any aspect of data transfer can be updated/modified based on the tier of service.

In yet another example, intelligent routing can be performed based on a matrix-based or similar determination of factors. For example, for a specific vehicle at a specific station, routing to a first destination is performed (based for example on a look-up table, an artificial intelligence analysis, and/or other determination method). For that same vehicle at another station, routing to a second destination is performed based on the matrix of variables. For that same vehicle at the another station, and for example needing a firmware update, another routing is performed. In general any information about the vehicle, contents, user, manufacturer, owner, manager, charging station and/or type of data can be used to determine routing and/or priority.

The NID 68 may be connected to a fiber distribution panel 70. Any suitable network interface device and fiber distribution panel can be used with the integrated station of the present disclosure. Suitable fiber distribution panels are produced by Clearfield (www.SeeClearfield.com). In one embodiment, the fiber distribution panel 70 is a Clearfield FieldSmart® Fiber Delivery Point such as described at www.seeclearfield.com/products/category/wall-box-metal/indoor-wall-panels.html which is incorporated herein by reference in its entirety. The fiber distribution panel 70 may optionally include a cassette 74, such as a Clearview Blue Cassette.

Optionally, a cable access enclosure 66 is positioned within a compartment 38B of the pedestal. In one embodiment, the NID 68 is associated with the cable access enclosure 66. The cable access enclosure 66 may be an AVEdge™ produced by Extron, such as the Extron AVEdge™ 100. However, any suitable cable access enclosure can be used with the charging station of embodiments of the present disclosure.

In one embodiment, a fiber optic cable 60 is connected to the fiber distribution panel 70. The fiber optic cable 60 is of a predetermined length. In one embodiment, the fiber optic cable 60 has a length of from approximately 3 feet to approximately 30 feet.

An optical connector 62 configured to connect to a data port 14 of the electric vehicle 10 is connected to the fiber optic cable 60. Any suitable optical connector 62 and fiber optic cable 60 known to one of skill in the art may be used with the integrated station 2 of embodiments of the present disclosure. In one embodiment, one or more of the optical connector 62 and fiber optic cable 60 may be obtained from Neutrik as part of the OpticalCon® Fiber Optic Connection System. Information about the OpticalCon® fiber optic connection system is available in "Technical Paper, OpticalCon® Fiber Optic Connection System" produced by Neutrik AG, Schaan, Liechtenstein which is incorporated herein by reference in its entirety.

Non-limiting examples of fiber connections usable with the present technology include those from Canford. Examples of such connectors can be found at: www.canford.co.uk/ProductResources/resources/N/Neutrik/OpticalCON/Opticalcon%20Brochure%202017_03%20V19.pdf. Further specifications regarding optional connectors can be found at www.canford.co.uk/ProductResources/resources/N/Neutrik/opticalCON%20Technical%20Paper%20V3.pdf. Additional resources regarding fiber bending radii and loss can be found at:
www.itu.int/dms_pub/itu-t/oth/0b/04/T0B040000542C01PDFE.pdf
www.itu.int/rec/T-REC-G.657-201611-I/en
all of which are incorporated herein by reference in their entirety.

The fiber optic cable 60 may be positioned on a reel 64 positioned in the pedestal. In one embodiment, the reel 64 is operable to retract the fiber optic cable 60. For example, the reel 64 optionally is biased to rotate such that the fiber optic cable will wind around an axis of the reel.

In one embodiment, the reel 64 is positioned in a compartment 38A of the pedestal. Optionally, the compartment 38A with the reel 64 does not include other components of the data transfer system 58 or the charger 50. In this manner, the fiber reel 64 can be isolated from other equipment. The optical connector 62 of the fiber optic cable 60 may extend through an aperture of a door 40 of the compartment. In one embodiment, when the pedestal 36 includes two fiber optic cables 60 connected to the data transfer system, a first fiber optic cable 60A is accessible from the front and a second fiber optic cable 60B is accessible from the back of the pedestal 36.

In one embodiment, the pedestal 36 includes an arm 42. An actuator can move the arm 42 in response to signals received from a control system 48 of the integrated station 2. In one embodiment, the arm is articulated and includes at least two sections 42A, 42B connected by a joint. The arm 42 can optionally include the cable 52 of the charger 50. Additionally, or alternatively, the arm 42 may include a fiber optic cable 60 associated with the data transfer system 58.

The integrated station 2 can optionally include at least one sensor 44 operable to sense the position of one or more of the receptacle 12 and the data port 14 of the electric vehicle 10 relative to the pedestal 36. The sensor 44 can be positioned on at least one of the shelter 20, the pedestal 36, and the arm 42.

The control system 48 can receive data from the sensor 44. Using the sensor data, the control system 48 can generate signals that cause an actuator of the arm 42 to move and connect the plug 54 to the vehicle receptacle 12 and/or the optical connector 62 to the vehicle data port 14. In this manner, one or more of the charger 50 and the data transfer system 58 can be automatically connected to an electric vehicle 10.

The integrated station 2 may also include landing pad 28 for an unmanned aerial vehicle (UAV) 18. The landing pad 28 can be configured to provide electricity and/or connect the UAV 18 to the network. In one embodiment, the landing pad 28 is positioned on the roof 24 of the integrated station 2. The landing pad 28 can be configured to connect to UAVs 18 of any size, weight or type, including UAV delivery drones.

Optionally, the integrated station 2 can communicate with the UAV 18 by a wireless or a wired network connection. For example, the landing pad 28 may include one or more of an Ethernet, a Wi-Fi and a cellular communication system to connect to the UAV. In one embodiment, the communication system is associated with the landing pad 28. Additionally, or alternatively, the integrated station 2 may include a sensor or beacon to guide the UAV 18 to the landing pad.

The landing pad 28 may optionally include an inductive element that is operable to charge and/or transfer data to a UAV 18. More specifically, in one embodiment the landing pad 28 includes at least one coil to transfer one or more of data and power to a UAV. Suitable inductive elements are known to those of skill in the art. Components of inductive charging and communication systems are described in U.S. Pat. App. Pub. 2010/0081473 and U.S. Pat. App. 2010/0277121 which are each incorporated by reference herein in their entirety.

Additionally, or alternatively, the integrated station 2 can be configured to transfer power and data to the UAV 18 by one or more wired connections. For example, the landing pad 28 can optionally include a port that is engaged by the UAV.

In one embodiment, the landing pad 28 is a Skysense Charging Pad. Features of the Skysense Charging Pad are described at https://www.skysense.co/charging-pad-outdoor which is incorporated herein by reference in its entirety. However, other landing pads produced by different manufacturers may be used with the charging station of the present disclosure.

Optionally, a solar panel 26 can be positioned on the roof 24. The solar panel 26 can convert sunlight into DC electricity. The electricity generated by the solar panel can be transferred to the UPS 72. In one embodiment, the integrated station 2 includes an inverter to convert the DC electricity into AC electricity. The integrated station 2 can then transfer electricity generated by the solar panel 26 to the electrical grid 4.

Figure 6:
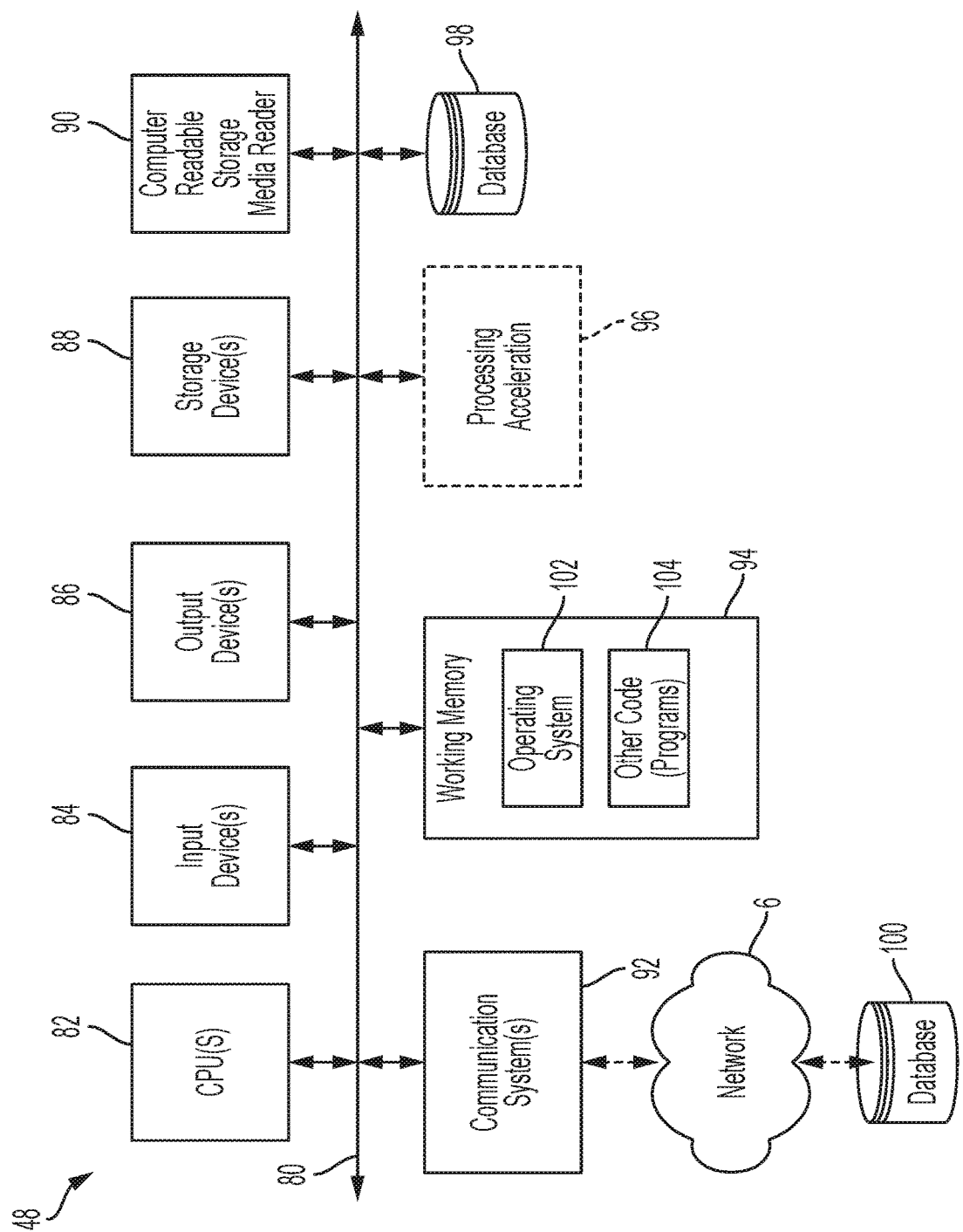
FIG. 6 is a block diagram of an embodiment of a control system of the present system.

Referring now to FIG. 6, a control system 48 of one embodiment of the present disclosure is generally illustrated. More specifically, FIG. 6 generally illustrates one embodiment of a control system 48 of the present disclosure that is operable to control aspects of the integrated station 2 of the present disclosure. The control system 48 is generally illustrated with hardware elements that can be electrically coupled via a bus 80. The hardware elements may include a central processing unit (CPU) 82; an input device 84 (e.g., a mouse, a keyboard, etc.); and an output device 86 (e.g., a display device, a printer, etc.). The control system 48 can also include a storage device 88. In one embodiment, the storage device(s) 88 can be disk drives, optical storage devices, solid-state storage device such as a random access memory ("RAM") and/or a read-only memory ("ROM"), which can be programmable, flash-updateable and/or the like.

The control system 48 can additionally include one or more of a computer-readable storage media reader 90; a communications system 92 (e.g., a modem, a network card (wireless or wired), an infra-red communication device, etc.); and working memory 94, which can include RAM and ROM devices as described above. In some embodiments, the control system 48 can also include a processing acceleration unit 96, which can include a DSP, a special-purpose processor and/or the like. Optionally, the control system 48 can also include a database 98.

The computer-readable storage media reader 90 can further be connected to a computer-readable storage medium, together (and, optionally, in combination with storage device(s) 88) comprehensively representing remote, local, fixed, and/or removable storage devices plus storage media for temporarily and/or more permanently containing computer-readable information. The communications system 92 can permit data to be exchanged with a network 6 and/or any other data-processing. Optionally, the control system 48 can access data stored in a remote storage device, such as a remote database 100 by connection to the network 6. In one embodiment, the network 6 may be the internet.

The control system 48 can also comprise software elements, shown as being currently located within the working memory 94. The software elements can include an operating system 102 and/or other code 104, such as program code implementing one or more methods and aspects of the presently disclosed technology.

One of skill in the art will appreciate that alternate embodiments of the control system 48 can have numerous variations from that described above. For example, customized hardware might also be used and/or particular elements might be implemented in hardware, software (including portable software, such as applets), or both. Further, connection to other computing devices such as network input/output devices can be employed.

Suitable control systems 48 are known to those of skill in the art. In one embodiment, the control system 48 is a personal computer, such as, but not limited to, a personal computer running the MS Windows® operating system. Optionally, the control system 48 can be a smart phone, a tablet computer, a laptop computer, and similar computing devices. In one embodiment, the control system 48 is a data processing system which includes one or more of, but is not limited to: an input device (e.g. a keyboard, mouse, or touch-screen); an output device (e.g. a display, a speaker); a graphics card; a communication device (e.g. an Ethernet card or wireless communication device); permanent memory (such as a hard drive); temporary memory (for example, random access memory); computer instructions stored in the permanent memory and/or the temporary memory; and a processor.

Optional functionality of the control system 48 includes one or more of indicators, instructions and audio/visual feedback to a user indicting one or more of the charging system and/or data transfer system have been successfully connected to the integrated station. Similar functionality can be included such that when one or more of the charging system and/or data transfer system are automated, these systems receive feedback regarding the state of connection of their respective receptacles. Optionally, available/occupied information from the integrated station can be supplied, for example, to the cloud or other resource that coordinates charging and data transfer to the vehicles.

The data transfer system can connect the integrated station to one or more of a local area network (LAN), a wide area network (WAN), the cloud, the Internet, one or more server(s), one or more database(s), and in general to any networked device(s) or destination (optionally in a high-availability configuration).

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The features of the various embodiments described herein are not intended to be mutually exclusive. Instead, features and aspects of one embodiment may be combined with features or aspects of another embodiment. Additionally, the description of a specific element with respect to one embodiment may apply to the use of that specific element in another embodiment, regardless of whether the description is repeated in connection with the use of the specific element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by such language as "for example," "such as," "by way of example," "e.g.," and other language commonly understood to indicate that what follows is an example.

The systems and methods of this disclosure have been described in relation to an integrated charging and data transfer station 2 according to embodiments of the present disclosure. However, to avoid unnecessarily obscuring the present disclosure, the preceding description omits several known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Several variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Aspects are directed toward:

A data transfer and charging station for a vehicle, comprising:
    a frame with a roof
    a pedestal positioned under the roof;
    a charger for transferring electricity from an electrical supply to a vehicle; and
    a data transfer system to connect the vehicle to a network, wherein the charger and the data transfer system are associated with the pedestal.

Any one or more of the above aspects, wherein the data transfer system includes a fiber optic cable with an optical connector to connect to a data port of the vehicle.

Any one or more of the above aspects, wherein the fiber optic cable is retained by a reel positioned within a compartment of the pedestal.

Any one or more of the above aspects, wherein the optical connector is associated with a plug of the charger.

Any one or more of the above aspects, wherein the data transfer system further comprises:
    an uninterruptible power supply;
    a network interface device to connect the data transfer system to the network; and
    a fiber distribution panel to connect the network interface device to the optical connector.

Any one or more of the above aspects, wherein the charger includes a cable extending from the pedestal, the cable including a plug to connect to a receptacle of the vehicle.

Any one or more of the above aspects, wherein the cable includes a fiber optic cable associated with the data transfer system, wherein the plug includes an optical connector to connect the vehicle to the network.

Any one or more of the above aspects, wherein the plug is positioned on an arm to automatically connect the plug to the vehicle receptacle.

Any one or more of the above aspects, wherein the roof includes a landing pad for an unmanned aerial vehicle.

Any one or more of the above aspects, wherein the landing pad can transfer electricity from the electrical grid to the unmanned aerial vehicle.

Any one or more of the above aspects, wherein the landing pad can connect the unmanned aerial vehicle to the network and transfer data to and from the unmanned aerial vehicle.

Any one or more of the above aspects, wherein the roof includes a solar panel to convert sunlight into DC power, the solar panel connected to the charger and the electrical grid.

A method of connecting a vehicle to a network and transferring electricity to the vehicle, comprising:
   positioning the vehicle proximate to a pedestal of a data transfer and charging station; connecting a plug of a charger to a receptacle of the vehicle, the charger connected to a source of electricity; and
   connecting an optical connector of a data transfer system to a data port of the vehicle, the data transfer system connected to the network, wherein the charger and the data transfer system are associated with the pedestal.

Any one or more of the above aspects, wherein the optical connector is associated with a fiber optic cable retained by a reel positioned in the pedestal.

Any one or more of the above aspects, wherein the plug of the charger includes the optical connector.

Any one or more of the above aspects, wherein connecting the plug of the charger to the receptacle of the vehicle further includes:
   determining a position of the receptacle of the vehicle;
   moving an arm of the data transfer and charging station proximate to the vehicle, wherein the arm includes the plug of the charger; and
   automatically connecting the plug to the receptacle.

Any one or more of the above aspects, further comprising: transferring a delivery route to the vehicle.

An integrated data transfer and charging station for a vehicle, comprising:
   a pedestal positioned within a structure;
   a charger for transferring electricity from an electrical supply to a vehicle; and
   an optical data transfer system to connect the vehicle to a network, wherein the charger and the data transfer system are associated with the pedestal.

Any one or more of the above aspects, wherein electricity for the electrical supply and optical fiber are provided within the same cable or in different cables.

Any one or more of the above aspects, further comprising one or more of a media converter, a network switch, a router, a modem, an access point, a transceiver, a Wi-Fi router and a wireless router.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

Unless otherwise indicated, all numbers expressing quantities, dimensions, conditions, ratios, ranges, and so forth used in the specification and claims are to be understood as being modified in all instances by the term "about" or "approximately". Accordingly, unless otherwise indicated, all numbers expressing quantities, dimensions, conditions, ratios, ranges, and so forth used in the specification and claims may be increased or decreased by approximately 5% to achieve satisfactory results. In addition, all ranges described herein may be reduced to any sub-range or portion of the range.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

To provide additional background, context, and to further satisfy the written description requirements of 35 U.S.C. § 112, the following references are incorporated by reference herein in their entireties: International Telecommunications Union recommendation G.657 ("Characteristics of a bending-loss insensitive single-mode optical fibre and cable") which is available at www.itu.int/rec/T-REC-G.657/en, Chinese Pat. Pub. CN103631239A, Chinese Pat. Pub. CN201887496U, Korean Pat. Pub. KR20170138663A, U.S. Pat. Nos. 6,853,795, 7,218,827, 8,929,069, 9,054,539, U.S. Pat. App. Pub. 2016/0336772, PCT Pub. WO 2011/156776A2, and PCT Pub. WO2016/113766A1.

What is claimed is:

1. A data transfer and charging station for a vehicle, comprising:
    a frame with a roof;
    a pedestal positioned under the roof;
    a charger to transfer electricity from an electrical supply to the vehicle;
    a data transfer system to connect the vehicle to a network, wherein the charger and the data transfer system are associated with the pedestal; and
    an intelligent data routing system configured to automatically route data moving from and/or to the vehicle at least based on a preferred end-point, wherein:
    data routing priority is capable of being provided to vehicles having a higher priority, and
    the automatic routing of the data for the preferred end-point is determined at least based on a type of data, information about the vehicle and information about the charging station.

2. The data transfer and charging station of claim 1, wherein the data transfer system includes a fiber optic cable with an optical connector to connect to a data port of the vehicle.

3. The data transfer and charging station of claim 2, wherein the fiber optic cable is retained by a reel positioned within a compartment of the pedestal.

4. The data transfer and charging station of claim 2, wherein the optical connector is associated with a plug of the charger.

5. The data transfer and charging station of claim 2, wherein the data transfer system further comprises:
    an uninterruptible power supply;
    a network interface device to connect the data transfer system to the network; and
    a fiber distribution panel to connect the network interface device to the optical connector.

6. The data transfer and charging station of claim 1, wherein the charger includes a cable extending from the pedestal, the cable including a plug to connect to a receptacle of the vehicle.

7. The data transfer and charging station of claim 6, wherein the cable includes a fiber optic cable associated with the data transfer system, wherein the plug includes an optical connector to connect the vehicle to the network.

8. The data transfer and charging station of claim 6, wherein the plug is positioned on an arm to automatically connect the plug to the vehicle receptacle based on information from one or more sensors.

9. The data transfer and charging station of claim 1, wherein the roof includes a landing pad for an unmanned aerial vehicle.

10. The data transfer and charging station of claim 9, wherein the landing pad can transfer electricity from the electrical supply to the unmanned aerial vehicle.

11. The data transfer and charging station of claim 10, wherein the landing pad can connect the unmanned aerial vehicle to the network and transfer data to and from the unmanned aerial vehicle.

12. The data transfer and charging station of claim 1, wherein the roof includes a solar panel to convert sunlight into DC power, the solar panel connected to the charger and the electrical supply.

13. The data transfer and charging station for a vehicle of claim 1, wherein the automatic routing is enabled utilizing an electronic signal, header information, identifier information, license plate information, Vehicle Identification Number (VIN) information, a physical identifier associated with the vehicle, a user, manufacturer information, owner information, manager information, and/or charging station information.

14. The data transfer and charging station for a vehicle of claim 1, wherein the automatic routing is to a cloud-based endpoint and the data is prioritized over other vehicles' data.

15. The data transfer and charging station for a vehicle of claim 1, wherein the automatic routing is based on a tier of service.

16. The data transfer and charging station for a vehicle of claim 1, wherein the automatic routing is based on a matrix-based determination of factors.

17. A method of connecting a vehicle to a network and transferring electricity to the vehicle, comprising:
    positioning the vehicle proximate to a pedestal of a data transfer and charging station;
    connecting a plug of a charger to a receptacle of the vehicle, the charger connected to a source of electricity;
    connecting an optical connector of a data transfer system to a data port of the vehicle, the data transfer system connected to the network, wherein the charger and the data transfer system are associated with the pedestal; and
    automatically routing data from and/or to the vehicle at least based on a preferred end-point, wherein:
    data routing priority is capable of being provided to vehicles having a higher priority, and
    the automatic routing of the data for the preferred end-point is determined at least based on a type of data, information about the vehicle and information about the charging station.

18. The method of claim 17, wherein the optical connector is associated with a fiber optic cable retained by a reel positioned in the pedestal.

19. The method of claim 17, wherein the plug of the charger includes the optical connector.

20. The method of claim 17, wherein connecting the plug of the charger to the receptacle of the vehicle further includes:
- determining a position of the receptacle of the vehicle;
- moving an arm of the data transfer and charging station proximate to the vehicle, wherein the arm includes the plug of the charger; and
- automatically connecting the plug to the receptacle.

21. The method of claim 17, further comprising:
- transferring a delivery route to the vehicle.

22. An integrated data transfer and charging station for a vehicle, comprising:
- a pedestal positioned within a structure;
- a charger for transferring electricity from an electrical supply to a vehicle;
- an optical data transfer system to connect the vehicle to a network, wherein the charger and the optical data transfer system are associated with the pedestal; and
- an intelligent data routing system configured to automatically route data from and/or to the vehicle via the optical data transfer system at least based on a preferred end-point, wherein:
  - data routing priority is capable of being provided to vehicles having a higher priority, and
  - the automatic routing of the data for the preferred end-point is determined at least based on a type of data, information about the vehicle and information about the charging station.

23. The integrated data transfer and charging station of claim 22, wherein electricity from the electrical supply for the vehicle and optical fiber to connect the vehicle to the network are provided within a single cable or in two different cables.

24. The integrated data transfer and charging station of claim 22, further comprising one or more of a media converter, a network switch, a router, a modem, an access point, a transceiver, a Wi-Fi router and a wireless router.

* * * * *